US006732715B2

(12) United States Patent
Fallahi et al.

(10) Patent No.: US 6,732,715 B2
(45) Date of Patent: May 11, 2004

(54) CONTROL METHOD

(75) Inventors: Abdolreza Fallahi, Pinner (GB);
Martin A P Sykes, Gillingham (GB)

(73) Assignee: Delphi Technologies, Inc., Troy, MI (US)

( * ) Notice: Subject to any disclaimer, the term of this patent is extended or adjusted under 35 U.S.C. 154(b) by 101 days.

(21) Appl. No.: 10/079,660

(22) Filed: Feb. 20, 2002

(65) Prior Publication Data

US 2002/0117152 A1 Aug. 29, 2002

(51) Int. Cl.$^7$ .................. F02D 41/40; G01M 15/00
(52) U.S. Cl. .............. 123/480; 73/119 A; 123/478; 123/490
(58) Field of Search ............... 123/456, 478, 123/480, 490; 73/119 A

(56) References Cited

U.S. PATENT DOCUMENTS

| | | | |
|---|---|---|---|
| 5,462,453 A | 10/1995 | Muller | |
| 5,535,621 A | 7/1996 | Glidewell et al. | ........ 73/119 A |
| 5,775,930 A | 7/1998 | Model et al. | |
| 6,071,153 A | 6/2000 | Fink et al. | |
| 6,142,813 A | 11/2000 | Cummings et al. | |
| 6,162,085 A | 12/2000 | Chugh et al. | |
| 6,168,445 B1 | 1/2001 | Seutschniker et al. | |
| 6,171,146 B1 | 1/2001 | Fink et al. | |
| 6,176,746 B1 | 1/2001 | Morello et al. | |
| 6,179,658 B1 | 1/2001 | Gunay et al. | |
| 6,203,364 B1 | 3/2001 | Cupak et al. | |
| 6,210,186 B1 | 4/2001 | Fink et al. | |
| 6,213,795 B1 | 4/2001 | Drescher et al. | |
| 6,227,168 B1 * | 5/2001 | Nishiyama | ............... 123/456 |
| 6,247,965 B1 | 6/2001 | Cummings et al. | |
| 6,276,960 B1 | 8/2001 | Schaefer et al. | |
| 6,305,957 B1 | 10/2001 | Fink et al. | |
| 6,338,651 B1 | 1/2002 | Svette, Jr. et al. | |
| 6,361,356 B1 | 3/2002 | Heberlein et al. | |
| 6,379,162 B1 | 4/2002 | Raypole et al. | |
| 6,383,033 B1 | 5/2002 | Politsky et al. | |
| 6,406,307 B2 | 6/2002 | Bungo et al. | |
| 6,416,119 B1 | 7/2002 | Gericke et al. | |
| 6,422,881 B1 | 7/2002 | Puhl et al. | |
| 6,485,318 B1 | 11/2002 | Schoepf | |
| 6,485,337 B2 | 11/2002 | Hsieh | |
| 6,494,751 B1 | 12/2002 | Morello et al. | |
| 6,508,666 B1 | 1/2003 | Francis | |
| 6,527,573 B2 | 3/2003 | Stein, Sr. et al. | |
| 6,533,611 B2 | 3/2003 | Morello et al. | |
| 6,537,099 B2 | 3/2003 | Herlinger et al. | |
| 6,547,605 B2 | 4/2003 | Daugherty et al. | |
| 6,553,819 B1 * | 4/2003 | Schernewski et al. | .... 73/119 A |
| 6,565,372 B2 | 5/2003 | Bakker et al. | |
| 6,607,393 B2 | 8/2003 | Raypole et al. | |

FOREIGN PATENT DOCUMENTS

| | | |
|---|---|---|
| DE | 19733897 | 2/1998 |
| EP | 0905359 | 3/1999 |
| EP | 0971115 | 1/2000 |
| GB | 2079366 | 1/1982 |
| JP | 8210174 | 8/1996 |

* cited by examiner

Primary Examiner—Tony M. Argenbright
(74) Attorney, Agent, or Firm—Jimmy L. Funke

(57) ABSTRACT

A control method for controlling the timing of fuel injection in a fuelling system for an engine comprising a fuel injector supplied with fuel from a source of fuel at high pressure, comprises varying a drive current which is supplied to the fuel injector at a first time so as to initiate or terminate a primary injection of fuel and monitoring the pressure of fuel within the source so as to detect when a variation in fuel pressure occurs. A time delay is measured, which represents the difference in time between the first time and a second, later time at which a variation in fuel pressure within the source is detected.

18 Claims, 1 Drawing Sheet

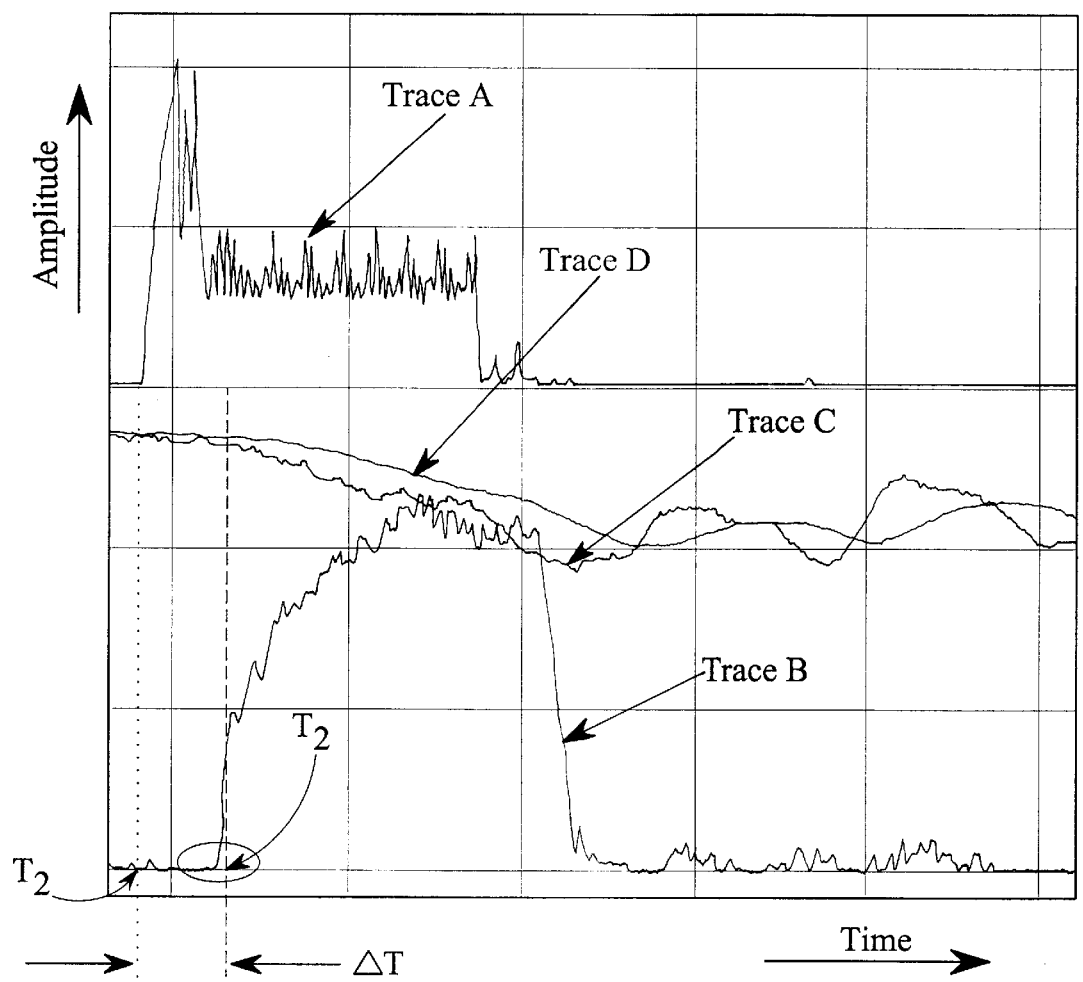

CONTROL METHOD

FIELD OF THE INVENTION

The invention relates to a method of controlling fuel injection in a fuelling system for a diesel engine. In particular, the invention relates to a method of controlling fuel injection in a common rail diesel system comprising a common rail arranged to deliver fuel to a plurality of fuel injectors.

BACKGROUND OF THE INVENTION

In conventional common rail fuel systems for diesel engines, it is known to supply a drive current to a fuel injector in order to cause movement of a valve needle away from a valve seating to initiate fuel injection. There is a time delay, referred to as the 'injection-start delay', between the drive current being supplied to the injector and the commencement of movement of the valve needle away from the seating. The injection-start delay is calibrated on test equipment and can be used in an appropriate control algorithm to ensure fuel injection is initiated at the desired stage of the injection cycle.

A problem with this method is that the delay between the supply of the drive current to the injector and the initiation of injection can vary depending on, for example, the pressure of fuel within the common rail, the engine battery voltage and the temperature of fuel. This can have an adverse effect on engine performance.

It is an object of the present invention to provide a control method for a diesel engine fuel system which alleviates this problem.

SUMMARY OF THE INVENTION AND ADVANTAGES

According to the present invention, a method of controlling the timing of fuel injection in a diesel engine fuel system including a fuel injector supplied with fuel from a high pressure fuel source, comprises the steps of;
  varying a drive current which is supplied to the fuel injector at a first time so as to initiate or terminate a first injection of fuel,
  monitoring the pressure of fuel within the source so as to detect when a change in fuel pressure occurs,
  calculating a time delay between the first time and a second, later time at which a change in fuel pressure within the source is detected, and
  using the measured time delay to adjust the time at which the drive current is varied so as to initiate or terminate a subsequent injection of fuel, thereby to ensure initiation or termination of the subsequent injection of fuel occurs at a required time.

By using the time delay measured for a previous injection of fuel to adjust the timing of initiation or termination of injection for a subsequent injection of fuel, any variation in the time delay due to different operating parameters of the engine can be compensated for. For example, the method permits variations in the temperature of fuel, the pressure of fuel within the source, engine battery voltage and injector manufacturing tolerances to be compensated for. This improves injection timing and, hence, engine performance throughout the injector service life.

In one embodiment, the method includes the steps of:
  generating a pressure output signal representative of fuel pressure within the source, and
  filtering noise frequency components from the pressure output signal and generating a filtered pressure output signal.

The method may comprise the step of increasing the drive current supplied to the fuel injector so as to initiate fuel injection.

In this embodiment, the method may include the step of determining a rate of change of the filtered pressure output signal and comparing said rate of change with a predetermined rate of change of pressure which is indicative of commencement of injection for a given source pressure.

In this embodiment of the invention, the method may comprise the steps of
  measuring an injection-start delay between (i) the time at which an increase in the drive current is supplied to the injector so as to initiate injection and (ii) the time at which the rate of change of the filtered rail pressure output signal exceeds the predetermined rate of change of pressure,
  and using the measured injection start-delay to adjust the time at which the drive current supplied to the injector is increased to initiate the subsequent injection of fuel.

As the valve needle of the injector commences movement away from its seating to commence injection, the pressure of fuel within the source will decrease. The occurrence of this decrease in fuel pressure can be detected by comparing the rate of change of the filtered pressure output signal with a predetermined rate of change of pressure upon commencement of injection (for a given source pressure) and this is used to provide an indication of the time at which fuel injection is actually commenced following supply of the drive current.

The method may include the steps of estimating an injection-start delay for the primary injection of fuel, calculating the difference between the measured injection-start delay and the estimated injection-start delay and using the difference to adjust the time at which the drive current is increased to initiate the subsequent injection of fuel.

Alternatively, the method may include the step of varying the drive current by decreasing the current supplied to the injector so as to terminate fuel injection.

In one embodiment, the method may include the step of determining a rate of change of the filtered pressure output signal and comparing said rate of change with a predetermined rate of change indicative of termination of injection for a given source pressure.

Conveniently, the method may include the steps of:
  measuring an injection-end delay between (i) the time at which decrease in the drive current is supplied to the injector so as to terminate injection and (ii) the time at which the rate of change of the filtered rail pressure output signal exceeds the predetermined rate of change of pressure,
  and using the measured injection end-delay to adjust the time at which the drive current supplied to the injector is decreased to terminate a subsequent injection of fuel.

The method may comprise the step of estimating an injection-end delay for the primary injection of fuel, calculating the difference between the measured injection-end delay and the estimated injection-end delay and using the difference to adjust the time at which the drive current is decreased to terminate the subsequent injection of fuel.

The subsequent injection of fuel may immediately follow the primary injection of fuel in an injection cycle.

The method is particularly suitable for use in controlling the injection of fuel in a common rail fuel system comprising a common rail for delivering fuel to a plurality of fuel injectors.

As the source pressure in a diesel engine fuel system is variable, it is necessary to compare the rate of change of the filtered pressure output signal with a predetermined rate of change of pressure for any given source pressure.

Thus, conveniently, the step of comparing said rate of change with a predetermined rate of change is performed in software by reference to a data map or look-up table.

BRIEF DESCRIPTION OF THE DRAWINGS

Other advantages of the present invention will be readily appreciated as the same becomes better understood by reference to the following detailed description when considered in connection with the accompanying, by way of example only, with reference to the accompanying FIGURE which illustrates various operating parameters of a fuel system as a function of time.

DETAILED DESCRIPTION OF THE PREFERRED EMBODIMENT

It is known to control the injection of fuel from a fuel injector by supplying a drive current to an actuator arrangement forming part of the injector so as to control movement of a fuel injector valve needle. Typically, for example, the actuator arrangement may take the form of a piezoelectric actuator arrangement, including one or more piezoelectric elements, or an electromagnetic actuator arrangement including an energisable winding. By supplying a drive current to the actuator arrangement, movement of the valve needle away from a valve seating is controlled, either directly by the actuator arrangement or through a hydraulic link to the actuator arrangement, so as to permit fuel injection through one or more outlet openings associated with the injector.

Referring to the accompanying FIGURE, Trace A represents a typical drive current which may be supplied to the injector to initiate movement of the valve needle away from its seating. The supply of the drive current is controlled by appropriate programming of an Engine Control Unit (ECU) or Engine Management System (EMS) in a manner which would be familiar to a person skilled in the art of engine control systems. Trace B represents movement of the valve needle away from the seating, such movement being initiated at time $T_2$. It can be seen from Traces A and B that the time, $T_2$, at which valve needle movement away from the seating is initiated, and hence the time at which fuel injection is commenced, occurs later than the time, $T_1$, at which the drive current is supplied to the injector. The time difference, $\Delta T$, represents the delay in time between the drive current being supplied to the injector and the injection of fuel being initiated. For the purpose of this specification, the time difference, $\Delta T$, shall be referred to as the 'injection-start delay'.

The source of fuel delivering fuel to the injectors may take the form of a common rail charged with fuel at high pressure by means of a high pressure fuel pump. The pressure of fuel within the common rail is conveniently measured by means of a rail pressure sensor, the output from which is represented by Trace C.

In order to utilise the rail pressure output signal in the control method of the present invention, it is necessary to apply a signal processing technique to remove noise frequency components (visible in Trace C). For example, a mathematical filtering process may be applied to the rail pressure output signal using an appropriate transfer function to remove such unwanted frequency components, thereby generating a filtered rail pressure output signal (Trace D). It can be seen from Trace D that the resultant, filtered rail pressure output signal is substantially free of noise.

When it is desired to inject fuel, the drive current (Trace A) is supplied to the injector to initiate movement of the valve needle away from its seating. Upon commencement of fuel injection, fuel is injected into an engine cylinder or other combustion space through the fuel injector outlet opening(s), giving rise to a measurable reduction in fuel pressure within the common rail. It can be seen in the accompanying FIGURE that the processed rail pressure signal (Trace D) decreases at time, $T_2$, when injection of fuel through the outlet opening is initiated.

It has been found that the injection-start delay, $\Delta T$, between the application of the drive current to the actuator arrangement and initiation of movement of the valve needle to commence injection varies depending on the operating parameters of the engine, such as, for example, the pressure of fuel within the common rail prior to injection, the engine battery voltage and the temperature of fuel within the common rail. In order to compensate for such variations in the injection-start delay, an adjustment is made to the timing of the application of a subsequent drive current, based on the preceding drive current, so as to ensure injection is initiated at the required time.

Initially, an estimated injection-start delay, $\Delta T_{EST}$, between the supply of the drive current to the injector and the commencement of fuel injection is used to initiate a primary injection of fuel at approximately the required time. The output signal from the rail pressure sensor (Trace D) is then used to determine the time at which fuel injection is actually commenced.

In order to determine the time at which fuel injection is actually commenced, the rate of change of pressure is determined from the filtered rail pressure output signal (Trace D). It is necessary to measure the rate of change of the filtered rail pressure output signal, as opposed to the directly measured rail pressure output signal (Trace C), otherwise the effects of noise on the direct signal may give rise to spurious results. For injection at a given rail pressure, the measured rate of change of pressure is compared with pre-calibrated data indicative of the rate of change of pressure upon commencement of injection. Conveniently, this may be achieved in software through use of data maps or look-up tables. If the rate of change of the filtered pressure output signal exceeds the predetermined rate of change of pressure (for the particular rail pressure), the time, $T_2$, is recorded. By measuring the time, $T_2$, at which fuel pressure within the common rail is decreased, an actual injection-start delay, $\Delta T_{ACTUAL}$, between the supply of the drive current to the injector and the commencement of fuel injection is then calculated.

The actual injection-start delay, $\Delta T_{ACTUAL}$, is then compared with the estimated injection-start delay, $\Delta T_{EST}$, to determine an offset which is used to adjust the time, $T_1$, at which the drive current is supplied to the injector for the subsequent injection event so as to ensure fuel injection is commenced at the required time.

It will be appreciated that, as the diesel fuel injection system is operable over a range of rail pressures, the step of comparing the measured rate of change of the filtered pressure output signal with the pre-determined rate of change of pressure will depend on the rail pressure and it is therefore necessary to pre-calibrate the system over the range of pressures at which the fuel system will operate.

A suitable adjustment can also be made for further, subsequent injections based on a preceding injection event.

It will be appreciated that, in order to reduce processing time, an adjustment to drive current supply timing need not be made for every injection event, but may be made for selected injection events, for example every tenth injection of fuel in an injection cycle.

It will be appreciated that the method of the present invention is not limited to use in controlling the time at which fuel injection commences, but may be used to control the timing of termination of injection. Upon closing movement of the valve needle against its seating to close the outlet opening, the pressure of fuel within the common rail will be increased. In this case, it is necessary compare the rate of change of the filtered pressure output signal with a predetermined rate of change in pressure (for a given source pressure) which is indicative of termination of injection when the valve needle is seated. An injection-end delay is then calculated as the time difference between the time at which the drive current is removed from the injector and the rate of change in the filtered pressure output signal exceeding said predetermined rate of change in pressure. The difference, or offset, between an estimated injection-end delay and an actual injection-end delay is then calculated and is used to adjust the time at which the drive current is removed from the injector to terminate a subsequent injection event.

A suitable adjustment can also be made for further subsequent injections based on a preceding injection event.

The invention provides the advantage that the timing of initiation or termination of injection can be adjusted throughout the service life of the injector, thereby improving engine performance. A wide range of manufacturing tolerances can be compensated for using the aforementioned technique, and an improved engine performance can be maintained over a range of engine operating conditions.

Obviously, many modifications and variations of the present invention are possible in light of the above teachings. The invention may be practiced otherwise than as specifically described within the scope of the appended claims.

What is claimed is:

1. A method of controlling the timing of fuel injection in a fuelling system for a diesel engine fuel system including a fuel injector supplied with fuel from a source of fuel arranged to supply fuel to the injector over a range of pressures within a high pressure fuel range, comprising:

varying a drive current which is supplied to the fuel injector at a first time so as to terminate a primary injection of fuel;

monitoring the pressure of fuel within the source so as to detect when a variation in fuel pressure occurs;

calculating a time delay between the first time and a second, later time at which a variation in fuel pressure within the source it detected, and using the measured time delay to adjust the time at which the drive current is varied so as to terminate a subsequent injection of fuel, thereby to ensure termination of the subsequent injection of fuel occurs at a required time;

generating a pressure output signal representative of fuel pressure within the source;

filtering noise frequency components from the pressure output signal and generating a filtered pressure output signal;

measuring an injection-start delay between (i) the time at which the increase in the drive current is supplied to the fuel injector so as to initiate injection and (ii) the time at which the rate of change of the filtered rail pressure output signal exceeds the predetermined rate of change of pressure;

estimating an injection-start delay for the primary injection of fuel;

calculating the difference between the measured injection-start delay and the estimated injection-start delay; and, using the difference to adjust the time at which the drive current is increased to initiate the subsequent injection of fuel.

2. A method as claimed in claim 1 comprising increasing the drive current supplied to the fuel injector so as to initiate fuel injection.

3. A method as claimed in claim 2, comprising determining a rate of change of the filtered pressure output signal and comparing said rate of change with a predetermined rate of change indicative of commencement of injection for a given operating pressure.

4. A method as claimed in claim 1 comprising varying the drive current by decreasing the current supplied to the fuel injector so as to terminate fuel injection.

5. A method as claimed in claim 4, comprising determining a rate of change of the filtered pressure output signal and comparing said rate of change with a predetermined rate of change indicative of termination of injection for a given operating pressure.

6. A method as claimed in claim 1, wherein the subsequent injection of fuel immediately follows the primary injection of fuel in an injection cycle.

7. A method as claimed in claim 1, wherein the source of fuel at high pressure takes the form of a common rail.

8. A method of controlling the timing of fuel injection in a fuelling system for a diesel engine fuel system including a fuel injector supplied with fuel from a source of fuel arranged to supply fuel to the injector over a range of pressures within a high pressure fuel range, comprising:

varying a drive current which is supplied to the fuel injector at a first time so as to terminate a primary injection of fuel;

monitoring the pressure of fuel within the source so as to detect when a variation in fuel pressure occurs;

calculating a time delay between the first time and a second, later time at which a variation in fuel pressure within the source it detected;

using the measured time delay to adjust the time at which the drive current is varied so as to terminate a subsequent injection of fuel, thereby to ensure termination of the subsequent injection of fuel occurs at a required time varying the drive current by decreasing the current supplied to the fuel injector so as to terminate fuel injection;

determining a rate of change of the filtered pressure output signal and comparing said rate of change with a predetermined rate of change indicative of termination of injection for a given operating pressure;

measuring an injection-end delay between (i) the time at which a decrease in the drive current is supplied to the fuel injector so as to terminate injection and (ii) the time at which the rate of change of the filtered rail pressure output signal exceeds the predetermined rate of change of pressure;

estimating an injection-end delay for the primary injection of fuel;

calculating the difference between the measured injection-end delay and the estimated injection-end delay; and, using the difference to adjust the time at which the drive current is decreased to terminate the subsequent injection of fuel.

9. A method of controlling the timing of fuel injection in a fuelling system for a diesel engine fuel system including a fuel injector supplied with fuel from a source of fuel arranged to supply fuel to the injector over a range of pressures within a high pressure fuel range, comprising:

varying a drive current which is supplied to the fuel injector at a first time so as to terminate a primary injection of fuel;

monitoring the pressure of fuel within the source so as to detect when a variation in fuel pressure occurs;

calculating a time delay between the first time and a second, later time at which a variation in fuel pressure within the source it detected;

using the measured time delay to adjust the time at which the drive current is varied so as to terminate a subsequent injection of fuel, thereby to ensure termination of the subsequent injection of fuel occurs at a required time;

generating a pressure output signal representative of fuel pressure within the source;

filtering noise frequency components from the pressure output signal and generating a filtered pressure output signal increasing the drive current supplied to the fuel injector so as to initiate fuel injection;

determining a rate of change of the filtered pressure output signal and comparing said rate of change with a predetermined rate of change indicative of commencement of injection for a given operating pressure, whereby the step of comparing said rate of change of the filtered pressure output signal with the predetermined rate of change is performed in software by reference to a data map.

10. A method of controlling the timing of fuel injection in a fuelling system for a diesel engine fuel system including a fuel injector supplied with fuel from a source of fuel arranged to supply fuel to the injector over a range of pressures within a high pressure fuel range, comprising:

varying a drive current which is supplied to the fuel injector at a first time so as to terminate a primary injection of fuel;

monitoring the pressure of fuel within the source so as to detect when a variation in fuel pressure occurs;

calculating a time delay between the first time and a second, later time at which a variation in fuel pressure within the source it detected, using the measured time delay to adjust the time at which the drive current is varied so as to terminate a subsequent injection of fuel, thereby to ensure termination of the subsequent injection of fuel occurs at a required time;

generating a pressure output signal representative of fuel pressure within the source; and, filtering noise frequency components from the pressure output signal and generating a filtered pressure output signal, whereby the step of comprising said rate of change of the filtered pressure output signal with the predetermined rate of change is performed in software by reference to a data map.

11. A method of controlling the timing of fuel injection in a fuelling system for a diesel engine fuel system including a fuel injector supplied with fuel from a source of fuel arranged to supply fuel to the injector over a range of pressures within a high pressure fuel range, the method comprising:

estimating a time delay for the primary injection of fuel;

varying a drive current which is supplied to the fuel injector at a first time so as to initiate or terminate a primary injection of fuel;

monitoring a pressure of fuel within the source so as to detect when a variation in fuel pressure occurs;

measuring a time delay between the first time and second, later time at which a variation in fuel pressure within the source is detected;

calculating a difference between the measured time delay and the estimated time delay; and using the difference to adjust the time at which the drive current is varied so as to initiate or terminate a subsequent injection of fuel, thereby to ensure initiation or termination of the subsequent injection of fuel occurs at a required time.

12. A method as claimed in claim 11, wherein said time delay is an injection-start delay.

13. A method as claimed in claim 11, wherein said time delay is an injection-end delay.

14. A method as claimed in claim 11, wherein said monitoring comprises generating a pressure output signal representative of fuel pressure within the source, and filtering noise frequency components from the pressure output signal and generating a filtered pressure output signal.

15. A method as claimed in claim 12, wherein said injection-start delay is a difference in time between (i) a time at which the increase in the drive current is supplied to the fuel injector so as to initiate injection and (ii) a time at which a rate of change of the filtered rail pressure output signal exceeds a predetermined rate of change of pressure.

16. A method as claimed in claim 15, wherein said predetermined rate of change of pressure is indicative of commencement of injection for a given operating pressure.

17. A method as claimed in claim 13, wherein said injection-end delay is a difference in time between (i) a time at which the decrease in the drive current is supplied to the fuel injector so as to terminate injection and (ii) a time at which a rate of change of the filtered rail pressure output signal exceeds a predetermined rate of change of pressure.

18. A method as claimed in claim 17, wherein said predetermined rate of change of pressure is indicative of termination of injection for a given operating pressure.

* * * * *